(12) United States Patent
Taylor

(10) Patent No.: US 8,086,911 B1
(45) Date of Patent: Dec. 27, 2011

(54) METHOD AND APPARATUS FOR DISTRIBUTED RECONSTRUCT IN A RAID SYSTEM

(75) Inventor: James Taylor, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 318 days.

(21) Appl. No.: 12/260,930

(22) Filed: Oct. 29, 2008

(51) Int. Cl.
*G06F 11/00* (2006.01)

(52) U.S. Cl. ......... 714/54; 714/6.22; 714/6.24; 711/114

(58) Field of Classification Search ........... 714/6, 13, 714/6.22, 6.24, 6.31, 54; 711/114
See application file for complete search history.

(56) References Cited

U.S. PATENT DOCUMENTS

| | | | | |
|---|---|---|---|---|
| 6,148,414 A | * | 11/2000 | Brown et al. ............... | 714/9 |
| 6,219,751 B1 | * | 4/2001 | Hodges ..................... | 711/114 |
| 6,601,138 B2 | * | 7/2003 | Otterness et al. .............. | 711/114 |
| 6,647,514 B1 | * | 11/2003 | Umberger et al. .............. | 714/42 |
| 7,363,426 B2 | * | 4/2008 | Ahmadian et al. ............ | 711/114 |
| 7,480,909 B2 | * | 1/2009 | McKean et al. ............... | 718/100 |
| 7,805,412 B1 | * | 9/2010 | Gibson et al. ................ | 707/690 |
| 2001/0049774 A1 | * | 12/2001 | Otterness et al. ............ | 711/148 |
| 2007/0226413 A1 | * | 9/2007 | Elliott et al. ................. | 711/114 |

* cited by examiner

*Primary Examiner* — Philip Guyton
(74) *Attorney, Agent, or Firm* — Perkins Coie LLP

(57) ABSTRACT

Embodiments of the present invention provide techniques for distributing the reconstruction process of a failed storage device in an array of storage devices to storage systems in a storage system cluster (cluster). The inventive technique includes a storage system securing the array, decomposing the reconstruction process into a number of tasks, distributing each task to other storage system in the cluster, and reconstructing data using results of the tasks performed by the other storage systems.

17 Claims, 8 Drawing Sheets

METHOD AND APPARATUS FOR DISTRIBUTED RECONSTRUCT IN A RAID SYSTEM

FIELD OF THE INVENTION

The present invention pertains to storage systems, and more particularly, to optimizing reconstruction operations for a failed storage device in a RAID group for a clustered storage system.

BACKGROUND

A storage system is a computer that provides access to information that is stored on one or more storage devices connected to the storage system, such as disk drives ("disks"), flash memories, or storage arrays. The storage system includes an operating system that may implement a file system to logically organize the information as a hierarchical structure of directories and files on a storage device (e.g., disks). Each file may be implemented as set of data structures, e.g., disk blocks, configured to store information, such as the actual data for the file.

A storage system may be further configured to operate according to a client/server model of information delivery to thereby allow many clients to access files stored on the storage system. In this model, the client may comprise an application executing on a computer that "connects" to the storage system over a computer network, such as a point-to-point link, shared local area network, wide area network or virtual private network implemented over a public network, such as the Internet.

In the operation of a storage array, it is fairly common that a disk, or other storage medium, such as flash memory, will fail. Data can be lost when one or more storage devices fail, making it impossible to recover data from the device. A typical scheme to avoid loss of data is parity protection wherein redundant encoding of the data allows for the loss of one or more disks without the loss of data.

A parity value may be computed by computing data across a number of similar disks holding different data and then storing the results in the array. Thus, if the disk storing parity values are lost, a parity value can be regenerated or reconstructed from the data on surviving disks. If one of the data disks is lost, the data can be reconstructed by computing the contents of the surviving disks using the parity values.

In one conventional implementation, disks are arranged into parity groups, each of which includes one or more data disks and at least one parity disk. The data structures representing the array are arranged into "stripes", with each stripe containing one block from each disk. Within a stripe, a portion of blocks contain data ("data blocks") and at least one block (not a data block) is a block which contains parity ("parity block"). The parity value stored on a parity block may be computed by, for example, the exclusive-OR (XOR) of all the data from all the data blocks.

If the parity blocks from each stripe are all stored on one disk, thereby providing a single disk that contains all (and only) parity information, the system is referred to as a Redundant Array of Inexpensive (or Independent) Disks level four implementation (RAID-4). This can be contrasted from a RAID-5 implementation which distributes the parity blocks across all disks in the array. In a dual parity scheme, e.g. RAID Double (or Diagonal) Parity (RAID-DP), a technique invented by NetApp, Inc. (formerly Network Appliance, Inc.) of Sunnyvale, Calif., data loss resulting from a two-disk failure can be reconstructed using two parity blocks. In RAID-DP, two dedicated disks serve as parity disks, wherein the first parity disk stores parity values from data computed across a single row stripe. The second parity disk stores parity values from data computed across staggered blocks (including a parity block from the first parity disk), otherwise referred to as a diagonal stripe.

In the physical operation of a disk, a disk is a self-contained rotating magnetic media storage device and data is accessed for input/output (I/O) operations when a stationary disk head positioned above the surface of a revolving disk writes data to or reads data from a physical location on disk. In the absence of disk access requests, i.e. I/O requests, a disk continues to revolve while awaiting its next request.

During reconstruction, resources of a storage system may be tied up reconstructing content from disk blocks (data values), as well as performing other activities such as data processing or servicing other I/O requests before providing data to a replacement disk. In the meantime, the replacement disk continues to revolve while awaiting a request to write a reconstructed data value to the replacement disk. Data may therefore not be supplied fast enough to the replacement disk to avoid wasted revolutions before receiving the request. This results in delays during reconstruction, thus affecting both performance and speed of a storage system.

SUMMARY

Embodiments of the present invention provide techniques for distributing the reconstruction process of a failed storage device (e.g. disk) in an array of storage devices to storage systems in a storage system cluster (cluster). The inventive technique includes a master storage system securing the array, decomposing the reconstruction process into a number of tasks, distributing each task to non-master storage systems in the cluster, and reconstructing data using results of the tasks performed by the non-master storage systems.

In a cluster, a constituent storage system with authority to access the array containing the failed device is the "master storage system." The master storage system is responsible for securing the array and decomposing and distributing the tasks to the other storage systems in the cluster, such other storage systems each referred to as a "non-master storage system." In the illustrative embodiment, each non-master storage system has read-only access to the array during reconstruction, and accesses the array for purposes of reconstruction and not for servicing client I/O requests.

Upon performing a task, the non-master storage system returns the result of the task to the master storage system and the master storage system generates a reconstructed data value using the result. A reconstructed data value is block data on the failed device to be stored to a corresponding data block on a replacement device or provided to a client in response to a client I/O request. Since a task, for example, may consist of reading a set of blocks from the surviving disks in the array and performing a logical operation on the read data, the master storage system no longer must access every surviving disk in the array to reconstruct the failed device. Data may therefore be provided to a replacement disk more efficiently to avoid wasted disk revolutions. Speed and performance of the master storage system during reconstruction are further increased since additional resources in the cluster perform portions of processing tasks in reconstruction.

Other aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
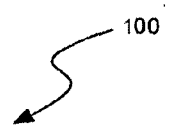
FIG. 1 shows an arrangement of data blocks on disks according to RAID-DP.

In broad overview, FIG. 1 shows an arrangement of data blocks on disks in an array according to a RAID-DP implementation. In FIG. 1, data sent to a storage system from a client(s) for storage as part of a write operation may first be divided up into variable or fixed-size, e.g. four Kilo Byte, blocks (e.g. D0, D1, etc.), which are then formed into groups that are stored as physical data blocks in a "stripe" (e.g. Stripe 1, Stripe 2, etc.) spread across multiple disks in an array (e.g. Data Disk 0, Data Disk 1, etc.). Row parity, e.g. an exclusive-OR (XOR) of the data in the stripe, is computed and may be stored in a parity block on a dedicated row parity disk. Diagonal parity, e.g. an XOR of the data and row parity in staggered blocks within a diagonal stripe is computed and may be stored in a parity protection block on a dedicated diagonal-parity disk.

The location of the parity depends on the type of protection scheme or protocol implemented. In the illustrative embodiment, the row parity, e.g. P0, P1, P2, P3, are stored in a first dedicated disk, e.g. Row Parity Disk. The diagonal parity, e.g. DP0, DP1, DP2, DP3, is parity distributed across disks in different stripes and are stored in a second dedicated disk, e.g. diagonal parity disk.

System Architecture

Figure 2:
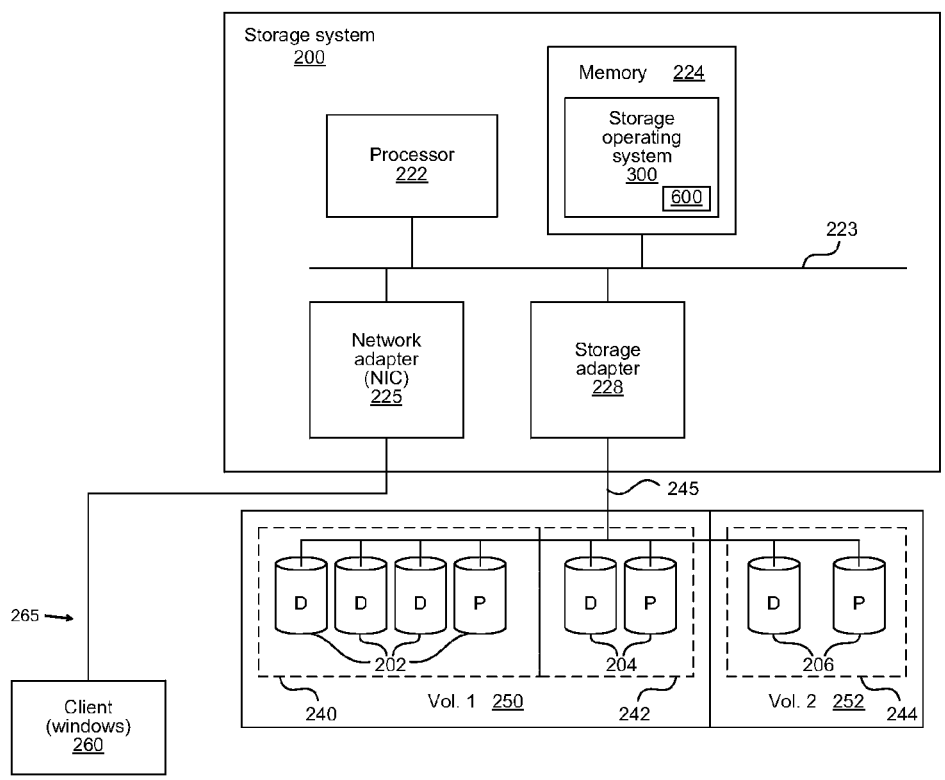
FIG. 2 is a block diagram of an illustrative embodiment of an environment including a storage system in which the invention may be advantageously implemented.

FIG. 2 is a block diagram of an illustrative embodiment of an environment including a storage system 200 that may advantageously implement the present invention. The storage system 200 is a computer that provides access to files stored on mass storage devices, such as disks 202, 204, 206 of a disk array 240, 242, 244. It will be appreciated that the present invention is not so limited by the illustrative embodiment such that disks 202, 204, 206 may comprise any type of mass storage devices, including but not limited to magnetic disk drives, flash memory, and any other similar media adapted to store information, including data and parity information. The storage system 200 includes a processor 222, a memory 224, a network adapter 225 and a storage adapter 228 interconnected by a system bus 223. The storage system 200 also includes a storage operating system 300 that implements a RAID optimization system 600, described further below, to optimize the reconstruction process of a failed disk in array 240, 242, 244.

In the illustrative embodiment, memory 224 includes storage locations that are addressable by the processor and adapters for storing software program code and data structures associated with the present invention. The processor and adapters may, in turn, include processing elements and/or logic circuitry configured to execute the software code and manipulate the data structures. The storage operating system 300, portions of which are typically resident in memory and executed by the processing elements, functionally organizes the storage system by, inter alia and in one embodiment, invoking storage operations in support of a file service implemented by the storage system. It will be apparent to those skilled in the art that other processing and memory means, including various computer readable media, may be used for storing and executing program instructions pertaining to the inventive techniques described herein.

The network adapter 225 includes the mechanical, electrical and signaling circuitry needed to connect the storage system 200 to a client 260 over a computer network 265, which may comprise a point-to-point connection or a shared medium, such as a local area network. The client 260 may be a general-purpose computer configured to execute applications. Moreover, the client 260 may interact with the storage system 200 in accordance with a client/server model of information delivery. That is, the client may request the services of the storage system (acting as a server), and the storage system may return the results of the services requested by the client, by exchanging packets 270 encapsulating, e.g., the Common Internet File System (CIFS) protocol or Network File System (NFS) protocol format over the network 265.

The storage adapter 228 cooperates with the storage operating system 300 executing on the storage system 200 to access information requested by the client 260. The information may be stored on any type of attached array of writeable media such as magnetic disk drives, flash memory, and any other similar media adapted to store information. In the illustrative embodiment described herein, however, the information is preferably stored in disk blocks on the disks 202, 204, 206. The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself) prior to being forwarded over the system bus 223 to the network adapter 225, where the information is formatted into a packet and returned to the client 260.

Storage of information on arrays 240, 242, 244 is preferably implemented as one or more storage "volumes" 250, 252 that comprise a cluster of disks 202, 204, 206 defining an overall logical arrangement of disk space. The disks 202, 204, 206 within a volume are typically organized as one or more groups of Redundant Array of Independent (or Inexpensive) Disks (RAID).

In one embodiment, to facilitate access to disks 202, 204, 206, the storage operating system 300 may implement a file system, e.g. write anywhere file system, that logically organizes the information as a hierarchical structure of directories and files on the disks. Each file may be implemented as a set of disk blocks configured to store information, such as data or parity, whereas the directory may be implemented as a specially formatted file in which other files and directories are stored. In the illustrative embodiment described herein, the storage operating system is preferably the NetApp® Data ONTAP® operating system available from NetApp, Inc., Sunnyvale, Calif. that implements a Write Anywhere File Layout (WAFL®) file system.

Storage Operating System

Figure 3:
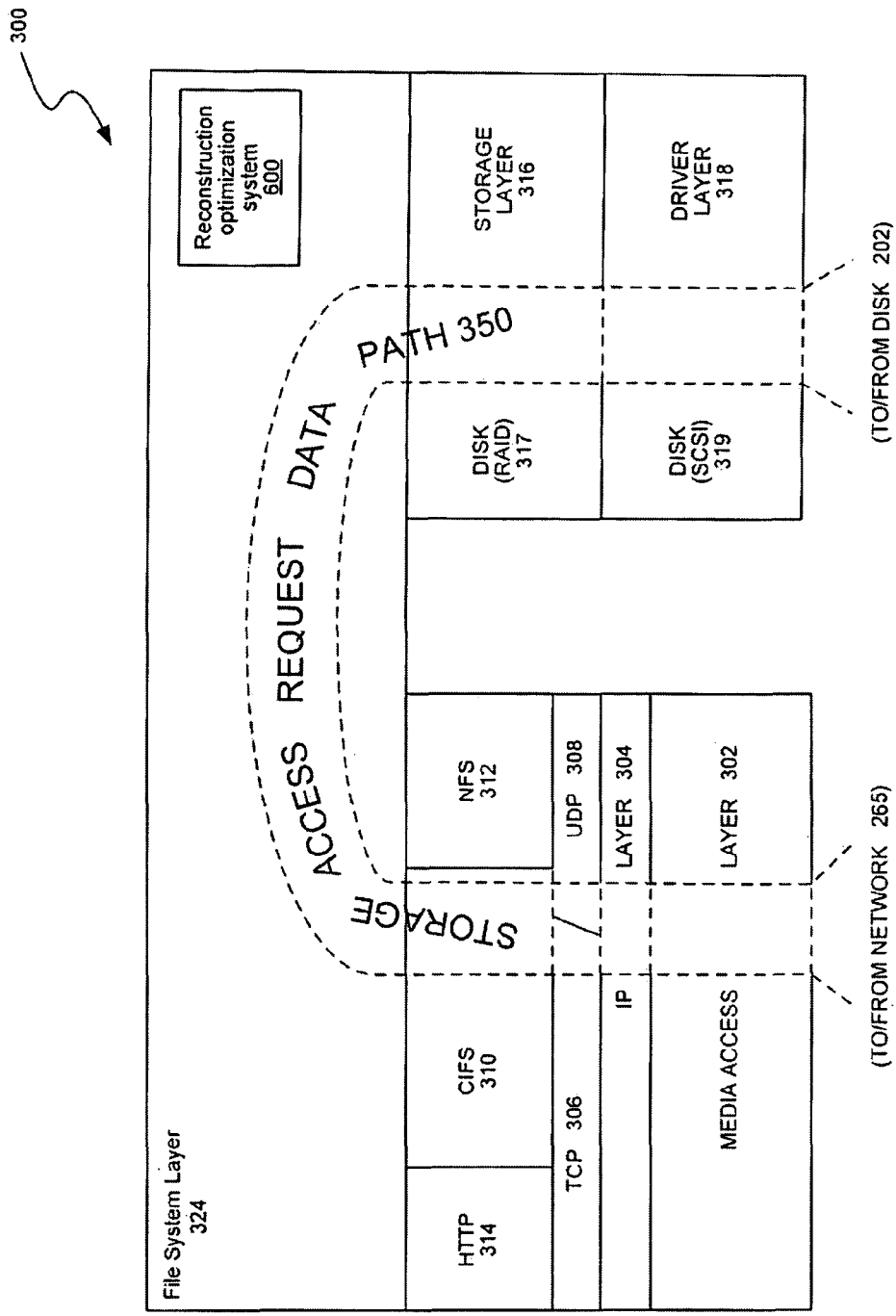
FIG. 3 illustrates a diagram showing architecture of the storage operation system for the storage system shown in FIG. 2, according to an embodiment of the present invention.

FIG. 3 is a schematic block diagram of an illustrative embodiment of a storage operating system executable, for example, in storage system 200 of FIG. 2, that may advantageously implement the present invention. In FIG. 3, the storage operating system 300 includes a series of software layers, including a media access layer 302 of network drivers (e.g., an Ethernet driver). The storage operating system further includes network protocol layers, such as the Internet Protocol (IP) layer 304 and its supporting transport mechanisms, the Transport Control Protocol (TCP) layer 306 and the User Datagram Protocol (UDP) layer 308. A file system protocol layer provides multi-protocol data access and, to that end, includes support for the CIFS protocol 310, the NFS protocol 312 and the Hypertext Transfer Protocol (HTTP) protocol 314. In addition, the storage operating system 300 includes a disk storage layer 316 that implements a disk storage protocol 317, such as a RAID protocol, and a disk driver layer 318 that implements a disk access protocol 319 such as a Small Computer Systems Interface (SCSI) protocol.

Bridging the disk software layers with the network and file system protocol layers, in one embodiment, is a file system layer 324 that implements the WAFL file system. The representation of the file system on disk is block-based using, e.g., 4 kilobyte (kB) blocks, and using modes to describe the files. An mode is a data structure which stores information about a file, directory, or other file system such as user and group ownership, access mode (read, write, execute permissions) and type of file. The illustrative file system uses files to store meta-data describing the layout of its file system; these meta-data files include, among others, an mode file. A file handle, i.e., an identifier that includes an mode number, is used to retrieve an mode from disk. As used herein, the term "storage operating system" generally refers to the computer-executable code operable on a computer to perform a storage function that manages data access and may, in the case of a storage system 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Operationally, a request from the client 260 is forwarded as, e.g., a conventional CIFS or NFS protocol packet 270 over the computer network 265 and onto the storage system 200 where it is received at the network adapter 225. A network driver of the media access layer 302 processes the packet, passes it onto the network protocol layers 304, 306, 308 and CIFS or NFS layer 310, 312 for additional processing prior to forwarding to the exemplary file system layer 324. Here, the file system generates operations to load (retrieve) the requested data from disk 202, 204, 206 if it is not resident in the memory 224. If the information is not in memory 224, the file system layer 324 indexes into the mode file using the mode number to access an appropriate entry and retrieve a logical volume block number (VBN). The file system layer then passes the logical VBN to the disk storage (RAID) layer 316, which maps that logical number to a disk block number and sends the latter to an appropriate driver (e.g., SCSI) of the disk driver layer 318. The disk driver accesses the disk block number from disks 202, 204, or 206 and loads the requested data block(s) in memory 224 for processing by the storage system. Upon completion of the request, the storage system (and storage operating system) returns a reply to the client 260 over the network 265.

It should be noted that the software "path" through the storage operating system layers described above needed to perform data storage access for the client request received at the storage system may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation increases the performance of the file service provided by storage system 200 in response to a storage system request packet 270 issued by client 260. Moreover, in another alternate embodiment of the invention, the processing elements of adapters 225, 228 may be configured to offload some or all of the packet processing and storage access operations, respectively, from processor 222, to thereby increase the performance of the file service provided by the storage system. It is expressly contemplated that the various processes, architectures and procedures described herein can be implemented in hardware, firmware or software.

It will be understood to those skilled in the art that the inventive techniques described herein may be utilized in any type of special-purpose (e.g., server) or general-purpose computer, including a standalone computer, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystem configured to perform a storage function and associated with other equipment or systems.

The operation system 300 in FIG. 3 may further be implemented with a concentrated parity technique that utilizes parity protection to protect against single and double failures, where a single failure is a loss of one storage device in an array and a double failure is a loss of two disks an array. In one embodiment, the disk storage (RAID) layer 317 assigns data blocks to parity sets. The RAID layer 317 cooperates with the file system layer 324 to logically divide the disks 202, 204, 206 into data and parity blocks that are then logically organized as RAID groups through the redundant writing of stripes across the disks, wherein each stripe contains data and parity blocks from each of the disks.

To reconstruct data when a device in the array fails, the RAID optimization system 600 is operative in the file system layer 324 to carry out the reconstruction process. RAID optimization system 600 identifies a failed disk by receiving an error code from driver layer 318. Such error codes are conventionally generated as provided by disk drives' manufacturers. When the failed disk is detected, the RAID optimization system 600 puts the array in which the failed disk was detected in the degraded mode. According to an embodiment of the present invention, RAID optimization system 600 logically replaces the failed disk with the replacement disk, which was initially configured as a spare disk of the array. In one embodiment, to logically replace the failed disk with the replacement disk, RAID optimization system 600 removes a data structure for the failed disk from a data structure for an array that included the failed disk. RAID optimization system 600 adds a data structure for the spare disk to the array data structure including the replacement disk.

A Cluster Environment: 2-Way Configuration

Figure 4:
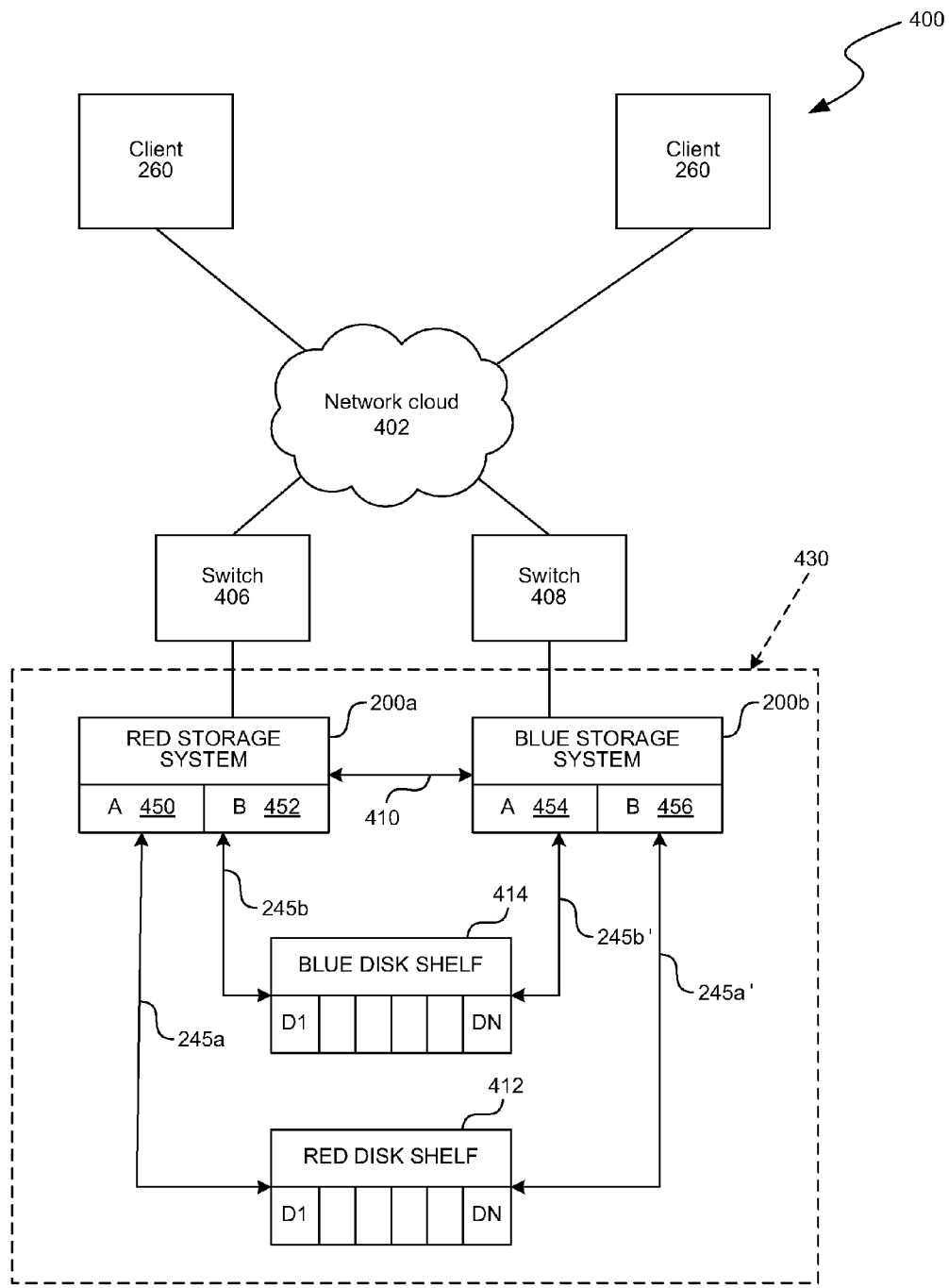
FIG. 4 is a schematic block diagram of an embodiment of a cluster environment which may implement the principles of the present invention.

FIG. 4 is a schematic block diagram of an embodiment of a cluster environment 400 which may implement the principles of the present invention. A cluster environment is a storage system architecture comprising a number of interconnected storage systems. In FIG. 4, two storage systems, red storage system 200*a* and blue storage system 200*b* are connected via a cluster interconnect 410 thus forming the clustered storage system 430. The cluster interconnect 410 can be any communication medium, including, for example, an Ethernet connection. It should be noted that while herein is shown only two storage systems, there may also be more than two storage systems in the clustered environment in accordance with various embodiments of the present invention.

One or more clients 260 may connect to the clustered storage system 430 via a network cloud 402. A client 260 may be a general-purpose computer, such as a PC, a workstation or a special-purpose computer, such as an application server or another storage system. The network cloud 402 connecting the client 260 with the clustered storage system 430 may be point-to-point links, wide area networks (WAN), local area networks (LAN) and/or any other networking architecture.

Attached to the network cloud 402 are intermediate network nodes, such as switches, 406 and 408, which connect to storage systems 200*a*, 200*b*, respectively.

In the illustrated example, red storage system 200*a* is connected to red disk shelf 412 and blue disk shelf 414 by data access loops 245*a*, 245*b*', respectively. A disk shelf is a group of storage devices, which in one embodiment, is organized as one or more arrays. A data access loop can be any networking media including, for example, a Fibre Channel Arbitrated Loop (FC-AL). It will be appreciated that data access loop 245*a* uses red disk shelf's A port 450 while data access loop 245*b*' uses red disk shelf's B port 452 to provide separate connections between red storage system 200*a* and disk shelves 412, 414. Similarly, blue storage system 200*b* accesses blue disk shelf 414 and red disk shelf 412 via data access loops 245*b*, 245*a*', respectively, where each disk shelf 412, 414 connects to separate ports 454, 456 of blue storage system 200*b*. Disk shelves 412, 414 are shown directly connected to storage systems 200*a*, 200*b* for illustrative purposes only; however, disk shelves 412, 414 and storage systems 200*a*, 200*b* may be connected via any switching network topology, e.g. Fiber Channel.

It will be appreciated that each storage system may include a RAID optimization system 600 to reconstruct failed devices and to replace them with spare disks on and electrically connected within disk shelves 412, 414.

A Cluster Environment: N-Way Configuration

Figure 5:
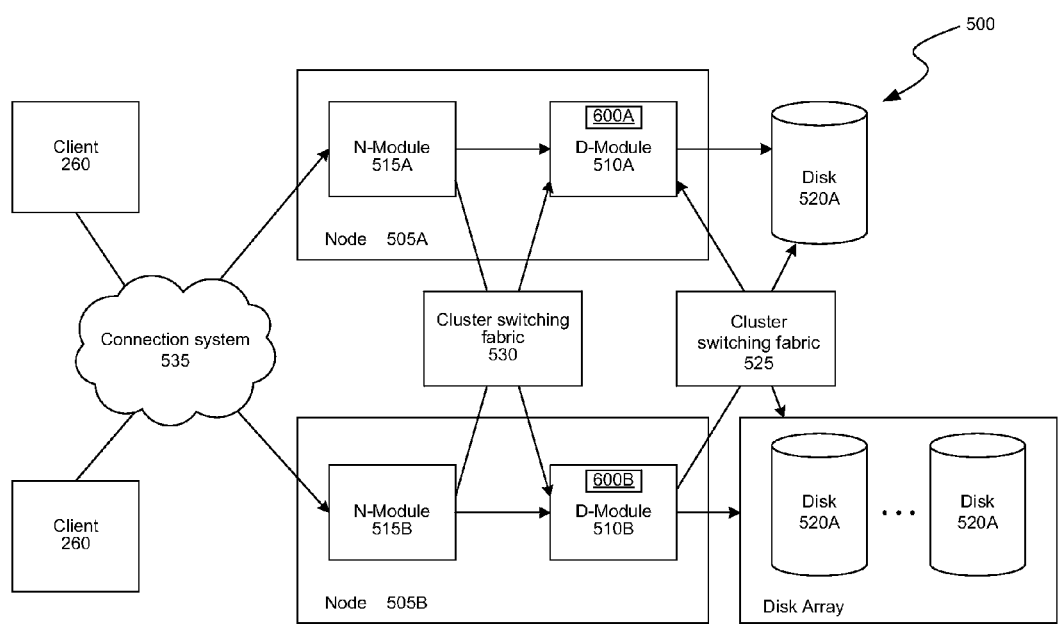
FIG. 5 is a schematic block diagram of another embodiment of a cluster environment which may implement the principles of the present invention.

FIG. 5 is a schematic block diagram of another embodiment of a cluster environment 500 which may implement the principles of the present invention. The clustered storage system in FIG. 5 includes two storage systems, wherein each storage system is referred to as a "node." Each node 505A, 505B is configured to provide services relating to information on storage devices 520A, 520B which are, for example, magnetic disk drives, flash memory, or any other similar media adapted to store information. In the illustrative example, nodes 505 are interconnected by a cluster switching fabric 530 which may be embodied as an Ethernet switch.

The nodes 505 are operative as functional components that cooperate to provide a storage system architecture of the cluster environment 500. Each node 505 is organized as a disk element (D-Module 510A, 510B) and a network element (N-Module 515A, 515B). Each D-Module 510 connects to one or more storage devices 520 via a cluster switching fabric 525, e.g. an Ethernet switch, and is operative to service device requests and perform data processing. In one embodiment, the D-Module 510 includes data processing and storage access components such as file system layer 324, storage layer 316, driver layer 318 from FIG. 3. In contrast, the N-Module 515 includes functionality that enables the node 505 to connect to clients 260 via a connection system 535, and in one embodiment, includes the protocol components such as media access layer 302, IP layer 304, TCP 306, UDP 308, and protocols 312, 310, 312 as shown in FIG. 3. Connection system 535 may be, for example, a computer network, such as a point-to-point link, shared local area network, wide area network or virtual private network implemented over a public network, such as the Internet.

It should be noted that while FIG. 5 shows an equal number of N- and D-Modules in the illustrative cluster, there may be different number of N- and D-Modules in accordance with various embodiments of the present invention. For example, there may be a number of N-Modules and D-Modules interconnected in a cluster configuration that does not reflect a one-to-one correspondence between the N- and D-Modules. As such, the description of a node comprising one N-Module and one D-Module should be taken as illustrative only. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002.

In implementing the principles of the present invention, in one embodiment, the RAID optimization system 600 resides in the D-Module 510 of node 505. The D-Module 510 performs processing tasks and services requests on disks 520 as required by the RAID optimization system 600. In one embodiment, the D-Module, e.g. D-Module 510A, may then distribute data to other D-Modules in the cluster environment, e.g. D-Module 510B, using the networking functionality of the N-Module, e.g. N-Module 515A.

RAID Optimization System

Figure 6:
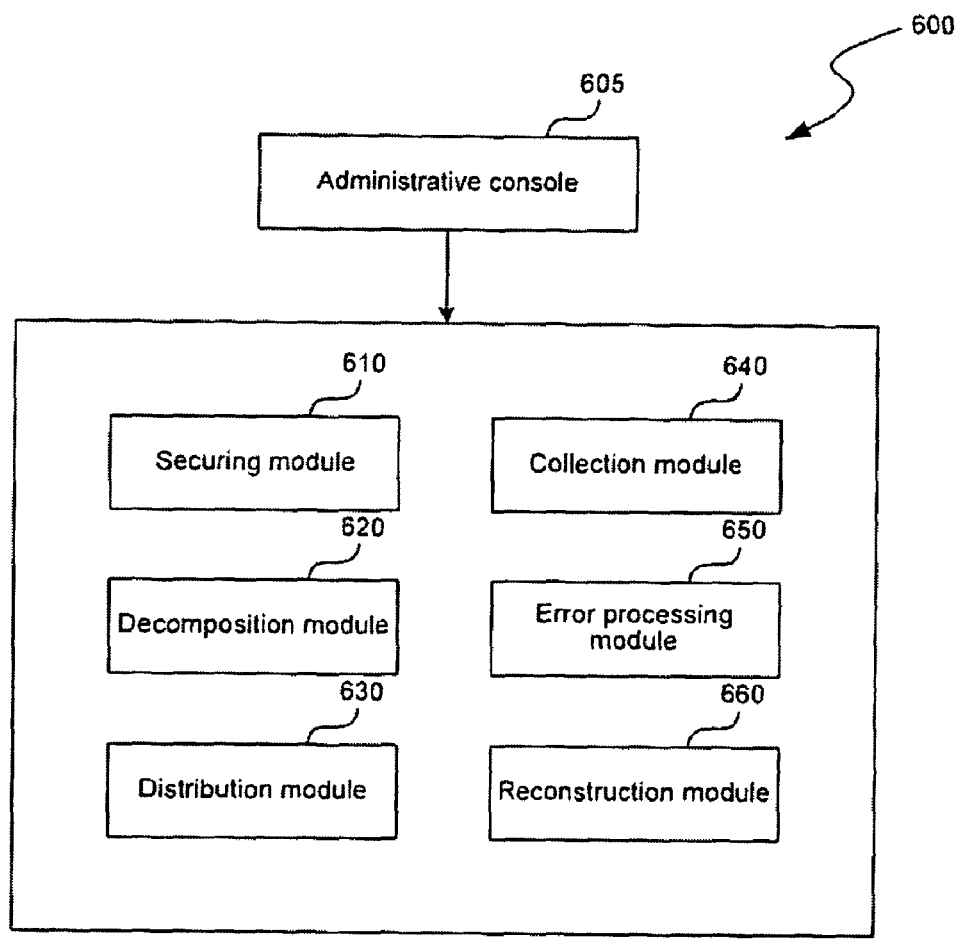
FIG. 6 is a block diagram illustrating one embodiment of a reconstruction optimization system for reconstructing data on a failed device.

FIG. 6 is a block diagram illustrating one embodiment of a RAID optimization system 600 for maintenance of an array of a storage system. In one embodiment, reconstruction is initiated, for example, by a human system administrator operating at an administrator console 605 connected to the storage system 200 (shown in FIG. 4) which owns the array to be reconstructed. In other embodiments, the administrator console 605 connects to a D-Module 510 of a node 505 (shown in FIG. 5) which services disk requests on the array. A storage system "owns" an array when it has authority to access or temporarily grant access rights for the array, e.g. service I/O requests such as read and write requests on the array, and is referred to as the "master storage system." For each array, in any given period of time, there should only be one master storage system according to the embodiment, and other storage systems in the cluster connected to the master storage system are each referred to as a "non-master storage system."

In one embodiment, reconstruction is initiated automatically by the RAID controller if the RAID controller detects a failed device and a spare disk is available in the array. In an alternative embodiment, to initiate reconstruction, the system administrator enters a command(s) via console 605 using, for example, Command Line Interface (CLI). The storage operating system 300 of the master storage system receives the command and causes the reconstruction optimization system 600 to initiate reconstruction. In yet another embodiment, a system administrator enters a command via console 605 to perform reconstruction at a later time according to a scheduled provided by the system administrator. There, the storage operating system 300 receives the command and causes the system 600 to reconstruct a failed device according to the schedule.

In further detail, components of the system 600 include securing module 610, decomposition module 620, distribution module 630, collection module 640, error processing module 650, and reconstruction module 660. When the system 600 initiates reconstruction, securing module 610 first secures the array to ensure the integrity of computations performed on data stored in the array during reconstruction.

Securing the array involves the master storage system regulating access to disk blocks in the stripe to ensure that new data is not written to stripe blocks while existing data from surviving disks is read and being computed. Securing the stripe may include storing the write requests from clients intended for blocks in the secured stripe until reconstruction of the stripe is complete. In one embodiment, the pending writes may be stored in memory, e.g. buffer memory, in the master storage system. After reconstruction is complete for a given stripe, the master storage system releases the stripe. Releasing of a stripe occurs, for example, when the master storage system services all write requests stored in memory to blocks in the reconstructed stripe.

In one embodiment, securing the stripe involves the master storage system locking the array so a non-master storage system has read-only access to blocks in the array. This may be accomplished, for example, when the storage operating system of a master storage system sends an instruction to a RAID controller, e.g. an executable software entity which carries out the I/O requests according to the RAID configuration implemented on the array, to permit read-only access by a particular storage system. In another embodiment, the master storage system grants read and exclusive write access to another storage system for a specific processing task such as writing a reconstructed data value to a replacement disk. Upon completion of the task, the RAID controller returns array access rights to the master storage system, which includes read and exclusive write access to the array.

The decomposition module 620 decomposes the reconstruction process into a number of tasks which are mutually exclusive. For example, a task includes a request to read a set of disk blocks and to perform a logical operation, e.g. XOR, on the data read from the blocks. To generate a task, the decomposition module 620 identifies the disk blocks to be read and gathers block location information such as drive number, block number, and number of blocks to be read. The information is then coupled with a computer-executed instruction to perform an XOR using the information, which together constructs a task. In one embodiment, the task may be stored in a data structure, such as an array, in the master storage system until all the tasks have been constructed.

It will be appreciated that the block information gathered by the decomposition module 620 permits a non-master storage system to access data in the array without awareness of the array configuration. Array configuration is the organization of data distributed across disk blocks in an array. When a master storage system owns an array, it is aware of the array configuration to service I/O requests on the array via the intelligence of the RAID layer 317. With the present invention, since the master storage system provides block location information to the non-master storage system as part of the task, the non-master storage systems do not need to know how files are organized in the array to access data. The non-master storage system may therefore read data on the surviving disks by accessing specific disk blocks.

The distribution module 630 is operative to distribute the tasks to a number of non-master storage systems in the cluster environment storage systems in the cluster environment. When a storage system is configured in a cluster environment, each storage system is aware of the overall cluster configuration, which includes information relating to the other storage systems in the cluster, such as each storage system's relative location. The distribution module 630 uses this storage system location information to send the task as a message, i.e. a computer executed instruction, from one storage system to another storage system. In response to a received message, a storage system will return a value computed from performance of an XOR on the requested blocks or an error indicating a failure to perform the requested task.

In one embodiment, the distribution module 630 may distribute tasks to all storage systems in the cluster environment equally or substantially equally. For example, if the reconstruction process involves three tasks and three storage systems (one master storage system and two non-master storage systems) are in the cluster, one task may be distributed to each of the storage systems, the master storage system performing one task, the first non-master storage system performing a second task, and the second non-master storage system performing a third task. Assuming reconstruction is decomposed into N tasks in a cluster with D storage systems in the cluster, N/D tasks (rounded down to the nearest integer) may be performed by each of the non-master storage systems in the cluster, with the remaining number of tasks performed by the master storage system. It will be appreciated that some embodiments of the invention include the non-master storage systems reading data from the surviving disks and a master storage system not reading data from any surviving disks to reconstruct data from the failed device.

In a second embodiment, the distribution module 630 evaluates the processing load on an intended storage system where a task may be distributed. Information from conventional load balancing software for evaluating the processing load of the storage systems in a cluster may be used by the distribution module 630 to determine which storage system in a cluster will receive a task. More particularly, conventional load balancing software may execute on each of the storage systems in the cluster, and report such load balancing information to the master storage system. For example, the software may measure the CPU activity for the storage system in which it is executing, the number of I/Os per second serviced by the respective storage system, or any other metric to measure a processing load of a storage system. Applying load balancing techniques with the present invention, in one embodiment, a first non-master storage system that is less loaded than a second non-master storage system may perform multiple tasks whereas the second non-master storage system may perform fewer tasks or no tasks at all based on the load of the second non-master storage system.

The collection module 640 of the system 600 collects the responses to messages from the non-master storage systems in the cluster. A response to a message may include a computed value, referred to herein as a "partial constructed data value." If a number of tasks have been distributed, the partial reconstructed data values may be stored in memory, e.g. buffer memory of the master storage system, until a response has been received from all the distributed tasks.

In one embodiment, a response to a task may include an error whereby the error processing module 650 performs additional processing to handle the error. An error may include a disk read error, an error in the physical connections between storage systems, or any other error where a disk has not failed but a storage system cannot otherwise complete the requested task. When an error occurs, in one embodiment, the error processing module 650 performs a read operation on all the disk blocks in the array, followed by an XOR on the read data. In another embodiment, the error processing module 650 determines the specific task resulting in an error and re-distributes the task to a different storage system. The result of processing by the error processing module 650 is a partial reconstructed data value for use by the reconstruction module 660.

The reconstruction module 660 is operative to compute the reconstructed data value. In particular, the reconstruction module 660 performs a logical operation, e.g. XOR, on the partial reconstructed data values received by the collection module 640 and the error processing module 650, if any, to generate the reconstructed data value. The reconstruction module 660 further writes the reconstructed data value to a replacement disk or provides the data value to a requesting client. In the event data is written to a replacement disk, the reconstruction module 660 instructs the RAID layer 317 to update the location of block data from the failed device to the replacement device prior to securing module 610 releasing the stripe. In one embodiment, the reconstruction module 660 instructs the RAID controller to permit access to blocks on the replacement device corresponding to blocks on the failed device. Thus, data on the failed disk is then accessible via the replacement disk.

Reconstruction Process

Figure 7:
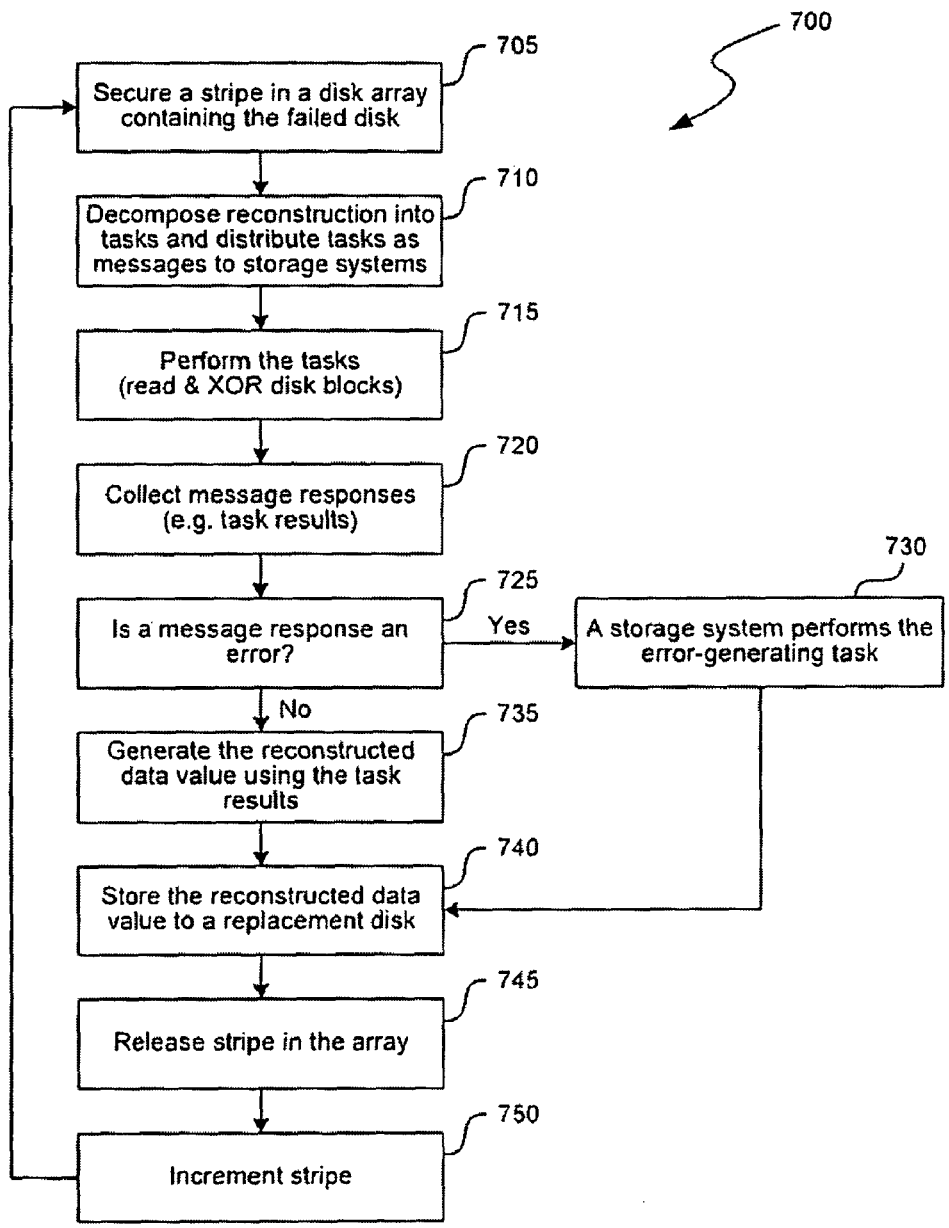
FIG. 7 is a flow diagram of a method for optimizing a reconstruction process according to one embodiment of the present invention.

FIG. 7 is a flow diagram of operations executed by a storage system according to one embodiment of the present invention. In the preferred embodiment, a master storage system carries out the operations of the reconstruction optimization system 600.

When a disk in an array fails, the array is prepared for reconstruction at step 705 by securing a stripe in the array. The master storage system secures the stripe, in one embodiment, by locking the stripe such that requested writes to blocks in the array are stored in memory of the master storage system while the stripe is locked. Additionally, non-master storage systems access blocks in the secured stripe with read-only access. Securing the stripe ensures that data on the surviving disks is not modified while reconstruction is performed, thus ensuring the integrity of data and parity value computations.

After securing the stripe, the master storage system decomposes the reconstruction process into separate tasks at step 710. A task includes instructions to perform a read operation(s) and a logical operation, e.g. XOR, on a particular set of disk blocks in the array. The master storage system then distributes the tasks, in the form of computer-executed instructions, i.e. messages, to non-master storage systems.

For example, referring to FIG. 1, data disk 4 has failed and D4 may be reconstructed from data on the surviving disks (data disks 0, 1, 2, 3, and row parity disk). The master storage system secures Stripe 1 and decomposes the reconstruction process into two, mutually exclusive tasks. One task includes reading data blocks D0 and D1, and XOR'ing the data from those blocks. A second task includes reading data blocks D2, D3, and P1, and XOR'ing the three values. It will be appreciated that any combination of block subsets may be configured in decomposing the reconstruction tasks, and aspects of the invention are not so limited by the subset configuration disclosed above.

In distributing the task, the master storage system provides the non-master storage system reconstruction block location information such as drive number, block number and number of blocks to be read. Advantageously, the non-master storage system may perform portions of the reconstruction by accessing data on surviving disks in the array without knowing the particular configuration of the array.

At step 715, the non-master storage systems read data according to the provided block location information and perform an XOR on the data read. Upon completion of the task, the non-master storage systems return a response to the master storage system or otherwise an error is received by the master storage system in response to a message at step 720. Successful completion of a task results in the return of a "partial reconstructed value" from the non-master storage system to the master storage system, where the partial reconstructed value is the result of a logical operation on a subset of data blocks in the stripe. Partial reconstructed values from the various storage systems are then stored in memory, such as buffer memory, of the master storage system for further processing.

In the event a non-master storage system fails to perform a task or otherwise fails to return a partial reconstructed data value, at step 725 the master storage system receives an error in response to a message. The master storage system then proceeds with error processing. In one embodiment, when an error is returned to a master storage system at step 730, the master storage system reads all blocks in the stripe and performs an XOR on the data read by the master storage system alone. In an alternative embodiment, the master storage system performs the particular task resulting in the error, and uses the partial reconstructed data value from the remaining non-master storage systems to calculate the reconstructed data value.

If no error is received by the master storage system, at step 735 the master storage system simply performs an XOR operation on all the partial reconstructed data values supplied by the non-master storage systems. The result of this final XOR operation is the reconstructed data value. In one embodiment, the reconstructed data value is stored to a corresponding data block on the replacement disk by the master storage system at step 740.

At step 745, the master storage system then releases the stripe in the array and increments to the next stripe in the array for reconstruction at step 750. The steps 705 through 750 are then repeating for reconstruction of the next stripe. When all the stripes in the array have been regenerated, I/O requests intended for the failed disk are redirected to the replacement disk.

Parity Scrub

The inventive techniques disclosed herein are further applicable to the process of a parity scrub performed on an array. A parity scrub is the process by which a storage system verifies that values in the parity blocks in the group stores the correct parity values according to the data on the data blocks. Similar to the reconstruction process, a parity scrub is performed on a stripe-level. All data blocks in a stripe are XOR'd together to compute a parity value. During the normal course of read and writes performed on disks in an array, a parity value may become invalid when writes to a data block are not followed with an update to the parity block. For example, a request to write a parity value may be lost by the storage system, a disk drive may misreport a parity block write request, or the request to write to the parity block may become corrupt.

Figure 8:
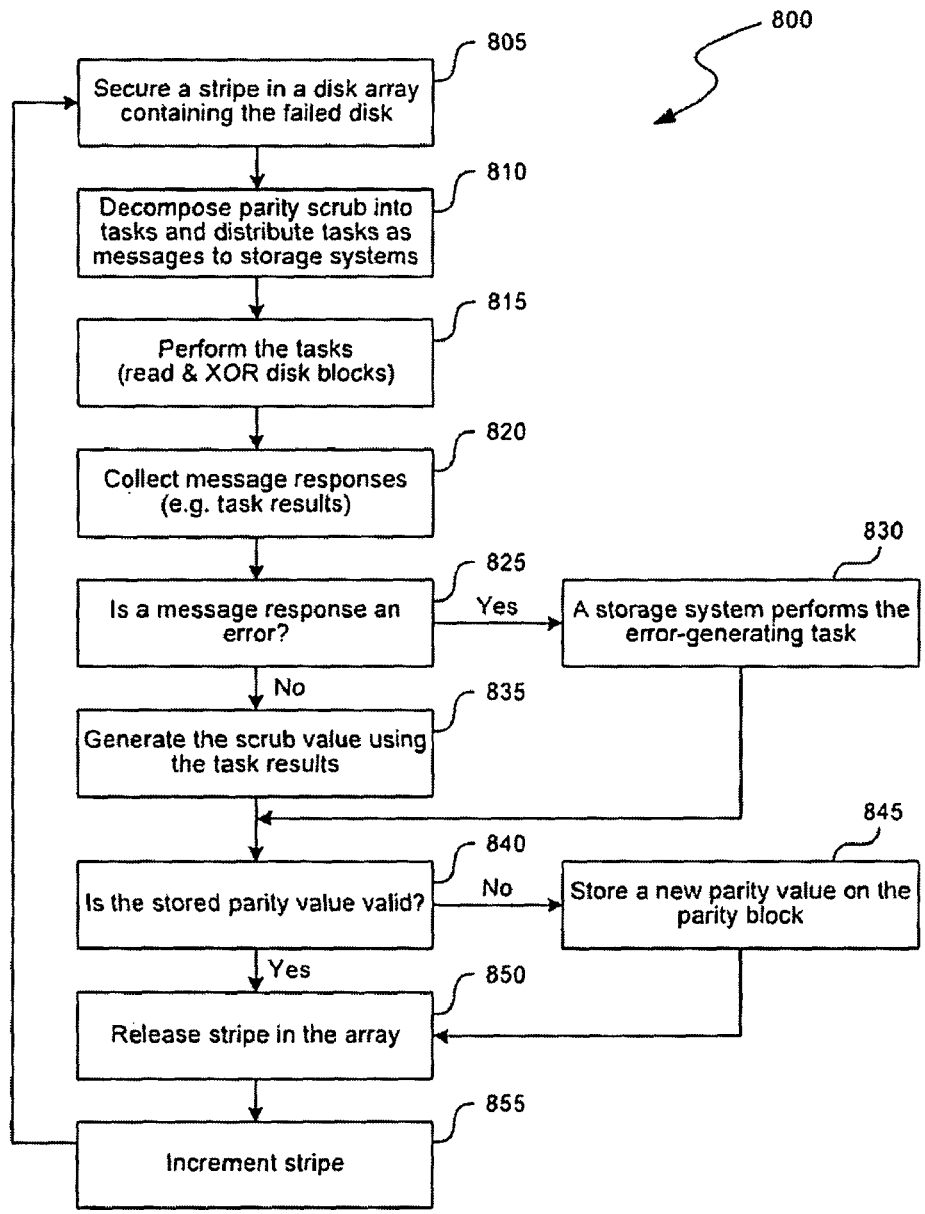
FIG. 8 is a flow diagram of a method for optimizing a parity scrub process according to one embodiment of the present invention.

FIG. 8 is a flow diagram of a method for optimizing a parity scrub process using the inventive techniques of the present invention according to one embodiment of the present invention.

At step 805, the master storage system secures a stripe in the array to ensure the integrity of the computations during the parity scrub. At step 810, the master storage system decomposes the parity scrub process into a number of tasks, e.g. read and XOR operations on particular disk block, and distributes the tasks to a number of non-master storage systems. In one embodiment, the parity scrub includes performing an XOR operation on data blocks only and comparing the result to the value in the parity block. In this embodiment, the master storage system decomposes the read and XOR operations for only the data blocks (and not the parity block) into tasks and distributes the tasks as messages to the non-master storage systems.

In an alternative embodiment, the scrub process includes performing an XOR on all the blocks in the stripe, including the parity block. When the parity value is used in a parity scrub calculation, validity of the value stored in the parity block is confirmed when the result of the XOR is a zero value. A zero value indicates that there are no differences between the XOR of data on the data blocks and the stored parity value.

The remaining steps 815 through 835 are analogous to the reconstruction process steps 715 through 735, wherein a non-master storage system performs a task as requested by the master storage system resulting in a "partial scrub value" (step 815). The non-master storage systems then provide a response (the partial scrub values) to the master storage system (step 820). At step 825, the master storage system performs error processing on the partial scrub value and generates a scrub value at step 835.

At step 840, the master storage system determines whether the stored parity value is valid. In the embodiment where the parity block is read and XOR'd along with the other data blocks, the scrub value must equal zero for the stored parity value to be valid. That is, there are no differences between the stored parity value and the XOR of data in the data blocks. In the alternative embodiment where only the data blocks are read and XOR'd, the scrub value must equal the stored parity value. Accordingly, in the alternative embodiment, the master storage system reads data stored in the parity block and compares the scrub value and the stored parity value to see if the two are the same.

If the stored parity value is not valid, e.g. the scrub value is not a zero value or the scrub value and the stored parity value do not match, then at step 845 the master storage system stores a new parity value on the parity block prior to releasing the stripe in step 850. If the stored parity value is not valid since the scrub value is not zero (e.g. the parity block was used in the scrub computation), the master storage system may repeat steps 810 through 835 on the data blocks only for the purposes of generating a new parity value. In particular, the master storage system may decompose and distribute the read and XOR operations of the data blocks to non-master storage systems and use the results from the non-master storage systems to construct the new parity value. If the stored parity value is not valid since the scrub value did not match the stored parity value (e.g. only data blocks were used in the scrub computation), the scrub value is the new parity value.

At step 845, the new parity value is stored to the appropriate parity block followed by the release of the stripe at step 850.

Other Embodiments and Alternatives

The parity scrub process repeats for the next stripe in the array (step 855) until the parity values in all the stripes have been verified.

For purposes of the illustrative embodiments in FIG. 7 and FIG. 8, the discussion focuses on the master storage system carrying out the respective steps of reconstruction and parity scrub. However, it will be appreciated that in other embodiments, the D-Module in a cluster (node) environment owns an array and is thus referred to as a master D-Module. Similar to the master storage system, the master D-Module may perform the processing steps on the array, including the steps of securing a stripe, decomposing the process into tasks, and reconstructing a failed device using the result of the tasks.

Aspects of the present invention may further be practiced in servicing data requests by a client intended for a failed device in one embodiment. Here, a client sends a request to the cluster, either to a master storage system or a non-master storage system, to access an array containing a failed disk. If received by a non-master storage system, the non-master storage system delivers the request to the master storage system for servicing. In servicing the request, the master storage system attempts to read a data block on the intended disk and recognizes that the intended disk has failed. The master storage system then reconstructs the data on the failed disk using the reconstruction process steps 705 through 735 described in FIG. 7. If the client request includes data stored on surviving disks, the master storage system may store, e.g. in memory, data read from the surviving disks while data from the failed disk is reconstructed. When all the block data necessary to service the client request is retrieved or reconstructed, the master storage system provides the requested data to the client.

It will be further appreciated that the inventive techniques may further optimize storage system performance by using the results of I/O requests from reconstruction or parity scrubs operations to service other I/O requests directed to the same disk block. Under normal operations, a storage system may service both external and internal I/O requests. An external request is an I/O request from a system connected to a storage system, such as a client, that relies on the storage system to obtain access. In contrast, an internal request is any I/O request in support of a storage system's customary operations such as system updates, reconstruction, parity scrubs, etc.

In cases where internal and external requests may be directed to the same disk block, disk access from an internal request (e.g. reconstruction) may also service an external request. This sharing technique is referred to as "piggy-backing" since the external request piggy-backs off the internal request. By servicing both types of request with one disk access, the disk access load on a storage system is thereby reduced. Thus, the inventive techniques implemented in cooperation with piggy-backing techniques can further increase the efficiency of a storage system during reconstruction or a parity scrub.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for increasing the efficiency of a parity scrub of an array of storage devices in a clustered storage system that includes a plurality of storage systems, the method comprising:
   securing the array, wherein a master storage system of the clustered storage system secures the array by regulating access to the array during the parity scrub;
   distributing at least one task of the parity scrub from the master storage system to at least one non-master storage system selected by the master storage system from the plurality of storage systems, the at least one non-master storage system accessing the array for purposes of the parity scrub and not for servicing I/O requests from a client; and
   determining, by the master storage system, validity of a stored parity value, wherein validity is determined by computing data in the array upon accessing a subset of storage devices and using a result of the at least one task performed by the at least one non-master storage system; and
   if the stored parity value is not valid, generating, by the master storage system, a new parity value and storing the parity value in the array.

2. The method of claim 1, the at least one task including a plurality of tasks and the at least one non-master storage system including a plurality of non-master storage systems.

3. The method of claim 1, wherein the master storage system selects the at least one non-master storage system to perform the at least one task based on the loading of the at least one non-master storage system.

4. The method of claim 1, the step of securing the array including the steps of storing in the master storage system I/O requests from the client intended for the array and the master storage system servicing the stored I/O requests after the validity of the stored parity value is determined.

5. The method of claim 1, wherein the master storage system regulating access to the array includes the master storage system having exclusive write-access to the array during a parity scrub and the at least one non-master storage system each having read-only access to the array for performing the at least one task.

6. The method of claim 1, wherein the at least one non-master storage system accesses the array without storing an array configuration in memory of the at least one non-master storage system, the at least one non-master storage system using block location information specific to the at least one task provided by the master storage system to the at least one non-master storage system in distributing the task.

7. The method of claim 1, the step of distributing the at least one task includes the master storage system sending a message to the at least one non-master storage system and the at least one non-master storage system returning a response to the master storage system, each response containing a partial scrub value.

8. A storage system in a clustered storage system, the storage system comprising:
   a processor;
   a securing module operatively coupled to the processor and configured to secure an array of storage devices to protect the integrity of operations performed on data in the array during a parity scrub;
   a distribution module coupled to the securing module and configured to enable the storage system to distribute at least one task of the parity scrub to a second storage system selected from a plurality of storage systems such that the second storage system accesses the array for purposes of the parity scrub and not for servicing I/O requests from a client; and
   a determination module coupled to the distribution module and configured to determine a validity of a stored parity value, wherein validity is determined by computing data in the array upon accessing a subset of storage devices and using a result of the at least one task performed by the second storage system; and
   if the stored parity value is not valid, a generation module coupled to the determination module configured to generate a new parity value and storing the parity value in the array.

9. The storage system of claim 8, further including a decomposition module coupled to the securing module configured to decompose the parity scrub into a plurality of tasks capable of being performed by a plurality of storage systems included in the clustered storage system.

10. The storage system of claim 8, wherein the distribution module is further configured to enable the storage system to send a message to the second storage system and to enable the second storage system to return a response to the storage system, each said response containing a partial scrub value.

11. The storage system of claim 8, wherein the storage system selects the second storage system to perform the at least one task based on a load on the second storage system.

12. The storage system of claim 8, wherein the securing module is further configured to enable the storage system to have exclusive write access to the array during the parity scrub and to enable the second storage system to have read-only access to the array for performing the at least one task.

13. The storage system of claim 8, wherein the at least one task includes performing a read operation and an exclusive-OR on a set of blocks in the array.

14. The storage system of claim 8, wherein the at least one task includes performing a read operation and an exclusive-OR on only data blocks.

15. The storage system of claim 8, wherein the at least one task includes performing a read operation and an exclusive-OR on a set of blocks including at least one data block and at least one parity block.

16. The storage system of claim 14, wherein the determination module is further configured to determine whether a scrub value matches the stored parity value.

17. The storage system of claim 15, wherein the determination module is further configured to determine whether a scrub value equals a predetermined value.

* * * * *